(12) United States Patent
Den Haak et al.

(10) Patent No.: US 8,979,380 B2
(45) Date of Patent: Mar. 17, 2015

(54) LOAD SENSING ON THE BASIS OF TRANSVERSE DEFORMATION

(75) Inventors: Nicolaas Simon Willem Den Haak, Woerden (NL); Brian Murray, Aberdeen (GB); Andreas Clemens Van Der Ham, Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/991,937

(22) PCT Filed: Dec. 6, 2010

(86) PCT No.: PCT/EP2010/007385
§ 371 (c)(1),
(2), (4) Date: Aug. 20, 2013

(87) PCT Pub. No.: WO2012/076024
PCT Pub. Date: Jun. 14, 2012

(65) Prior Publication Data
US 2013/0322801 A1   Dec. 5, 2013

(51) Int. Cl.
*F16C 41/00*  (2006.01)
*G01L 5/00*  (2006.01)

(52) U.S. Cl.
CPC .................... *G01L 5/0009* (2013.01)
USPC ........................................................ 384/448

(58) Field of Classification Search
CPC .............. F16C 19/522; F16C 2240/12; F16C 2240/18; G01L 5/0019; G01R 1/12; G01R 11/12

USPC ............. 384/448, 609, 610, 618, 619; 73/114.81, 115.07, 862.621–862.642; 324/173–174, 207.25
See application file for complete search history.

(56) References Cited

U.S. PATENT DOCUMENTS

| | | | |
|---|---|---|---|
| 4,015,468 A | 4/1977 | Simon | |
| 5,140,849 A * | 8/1992 | Fujita et al. | 73/593 |
| 6,571,632 B1 * | 6/2003 | Browner et al. | 73/593 |
| 7,389,701 B2 | 6/2008 | Mol | |
| 7,444,888 B2 | 11/2008 | Mol | |
| 2002/0062694 A1 | 5/2002 | Ehrfeld et al. | |
| 2007/0277612 A1 * | 12/2007 | Ehrfeld et al. | 73/593 |
| 2008/0202226 A1 * | 8/2008 | Heim et al. | 73/114.81 |

FOREIGN PATENT DOCUMENTS

| | | |
|---|---|---|
| DE | 102004054201 A1 | 5/2006 |
| DE | 102008016790 A1 * | 10/2009 |
| EP | 1659385 A2 | 5/2006 |
| EP | 1939598 A1 | 7/2008 |

* cited by examiner

*Primary Examiner* — Phillip A Johnson
(74) *Attorney, Agent, or Firm* — Bryan Peckjian; SKF USA Inc. Patent Dept.

(57) ABSTRACT

The sensing of a mechanical load on a rolling element bearing, in operational use of the bearing, is carried out by measuring the strain on a surface (212) of the bearing that faces in a direction substantially perpendicular to a direction of the mechanical load.

10 Claims, 5 Drawing Sheets r = $R_0$ r = $R_0 + \delta$ r = $R_0 - \delta$

LOAD SENSING ON THE BASIS OF TRANSVERSE DEFORMATION

CROSS-REFERENCE

This application is the U.S. national stage of International Application No. PCT/EP2010/007385 filed on Dec. 6, 2010, the contents of which are herein fully incorporated by reference.

FIELD OF THE INVENTION

The invention relates to a method of determining a mechanical load on a rolling element bearing. The invention also relates to a radial bearing and to an axial bearing, each provided with one or more deformation sensors.

BACKGROUND ART

Load sensing technology is a technology for determining a load carried by a certain structure or a machine, or by a component thereof. The structure, machine or component is then provided with one or more load sensors. For example, the machine is an automobile and the individual loads on individual ones of the wheels are determined via the wheel hubs. The information about the loads is used to electronically control, e.g., the amount of power supplied to each driven wheel individually, or the amount of braking applied to each individual wheel, or to adjust the suspension system for each wheel individually, in order to improve the vehicle's road handling. Load sensing technology is also used in, e.g., payload weight measurements on machines such as trucks for bulk transport, warehouse trolleys, household washing machines, conveyor belts, elevators, cranes and hoisting equipment, etc.

Load sensing technology is also used in condition monitoring of machines such as, e.g., wind turbines, industrial equipment, marine propulsion systems, aeronautic propulsion systems, etc.

A specific branch of load sensing technology relates to the sensing of a load on a rolling element bearing. Load sensing enables to determine the running conditions of the rolling element bearing, e.g., for calculating the service life, monitoring over-load conditions and under-load conditions, etc.

The load on the rolling element bearing causes an elastic deformation of the rolling element bearing. Typical methods, known in the art, of measuring the load on a rolling element bearing include sensing the local deformations of the housing of the rolling element bearing, or sensing the local deformations of the rolling element bearing, caused by the load on the rolling element bearing. Consider, for example, a typical rolling element bearing designed to support a radial load or a typical rolling element bearing designed to support a predominantly radial load and in addition some axial loads. Such a rolling element bearing comprises a concentric arrangement of an inner ring, an outer ring and a plurality of rolling elements accommodated between the inner ring and the outer ring. One or more strain gauges are positioned at a cylindrical outer surface of the outer ring. In operational use of the rolling element bearing, the strain gauges provide signals representative of the local deformations of the outer ring, from which the load can be determined For more background information, also see, e.g., U.S. Pat. No. 7,444,888, issued to Hendrik Anne Mol and Gerrit Cornelis van Nijen, and U.S. Pat. No. 7,389,701, issued to Hendrik Anne Mol, both incorporated herein by reference.

SUMMARY OF THE INVENTION

The inventors have recognized that the known methods of determining the load on a rolling element bearing work well, but that they require a rather invasive technique. In order to appreciate the invention, first consider a rolling element bearing, such as a rolling element bearing configured for supporting a radial load (referred to herein as a "radial bearing") or a rolling element bearing configured for supporting a predominantly axial load, such as a thrust bearing (referred to herein as an "axial bearing").

Such a rolling element bearing typically comprises a first ring and a second ring that are configured for substantially coaxial rotation relative to each other around an axis, and a plurality of rolling elements accommodated between the first ring and the second ring.

Examples of a radial bearing are deep-groove ball-bearings, spherical roller bearings, angular contact ball bearings, cylindrical roller bearings, needle roller bearings, and taper roller bearings. For example, a deep-groove ball-bearing is designed for supporting predominantly radial loads, whereas a spherical roller bearing is typically designed for accommodating both heavy radial loads as well as heavy axial loads. In a radial bearing, the first ring and the second ring are not only co-axial but also concentric. That is, one of the first ring and the second ring (i.e., the inner ring) lies concentrically within the other one of the first ring and the second ring (i.e., the outer ring), and the first ring and the second ring lie in substantially the same plane substantially perpendicular to the axis. The paths traversed by the plurality of rolling elements, when the radial bearing is in operational use, are concentric with the first ring and the second ring. The inner ring and the outer ring form a coplanar configuration and rotate coaxially relative to each other.

In an axial bearing, the first ring and the second ring are arranged so as to be co-axial, but not concentric. The first ring lies in a first plane substantially perpendicular to the axis, and the second ring lies in second plane substantially perpendicular to the axis and spaced apart from the first plane. The paths traversed by the plurality of rolling elements when the axial bearing is in operational use, are coaxial with the first ring and the second ring, but lie in another plane substantially parallel with the first plane and second plane.

Next consider determining the load on a radial bearing via sensors that sense the deformation of either the radial bearing or the housing accommodating the radial bearing, or both. The first ring, referred to above is, e.g., the outer ring whereas the second ring, referred to above, is the inner ring. One or more sensors are positioned at the one or more of the following conventional locations: the cylindrical outer surface of the outer ring; the cylindrical inner surface of the inner ring; the cylindrical inner surface of a housing that engages with the cylindrical outer surface of the outer ring of the rolling element bearing; and a cylindrical outer surface of a shaft that engages with a cylindrical inner surface of the inner ring. Each specific one of these locations may be shaped in order to accommodate a specific one of the sensors and to preserve the sensor's physical integrity in operational use of the rolling element bearing. For example, a groove is cut into the cylindrical outer surface of the outer ring wherein one or more sensors are then positioned. In addition, the one or more sensors need to be connected to the outside world, e.g., by electrically conductive wires, in order to be powered and to provide the sensor signals indicative of the deformations as sensed. This implies that at least one of the rolling element bearing, the housing and the shaft needs to be adapted or modified in order to provide room for the sensors and the connections to the outside world. Such modification is costly. Such a modification to the housing, to the shaft or to the rolling element bearing may interfere with the mechanical or structural integrity of the housing, of the shaft or of the rolling element bearing, respectively. A modification to the housing or to the shaft may also be undesired by the supplier of the machinery, of which the rolling element bearing forms a functional part.

Further, consider determining the load on an axial bearing arranged between two parts of a machine. The load is determined via sensors that sense the deformation of either the axial bearing or of one or both of the machine's parts, or of both the axial bearing and at least one of the machine's parts. The first ring, the second ring and the plurality of rolling elements forms an axially stacked arrangement. One could position one or more sensors at a first flank of the first ring or at a second flank of the second ring, the first flank and the second flank facing axially outwards. The first flank and the second flank form the surfaces onto which the machine's parts exerts a thrust on the axial bearing, giving rise to a deformation of the axial bearing with at least an axially oriented component that can be sensed. However, the first flank and/or the second flank need to be modified to accommodate the sensors in order to preserve the physical integrity of the sensors, thus affecting in turn the physical integrity of the relevant flank, and increasing costs. Likewise, the sensors could be accommodated on the surface of one or on the surfaces of both of the machine's parts that face the axial bearing. However, the surfaces would need to be modified in order to accommodate the sensors in such a manner as to preserve the physical integrity of the sensors, thus affecting in turn the physical integrity of the parts and increasing costs.

Accordingly, the inventors propose to sense the deformation at a surface of the first ring and/or another surface of the second ring that face in a direction substantially different from another direction, along which the first ring and the second ring are pressed towards each other via the plurality of the rolling elements due to the mechanical load on the rolling element bearing.

More specifically, the inventors propose a method of determining a mechanical load on a rolling element bearing. The rolling element bearing comprises a first ring and a second ring that are configured for substantially coaxial rotation relative to each other around an axis. The rolling element bearing also comprises a plurality of rolling elements accommodated between the first ring and the second ring.

The method comprises sensing a deformation of at least a specific one of the first ring and the second ring in operational use of the rolling element bearing, at at least a specific surface of the specific ring that faces in a direction substantially perpendicular to a further direction of a main vector component of the mechanical load on the rolling element bearing, wherein the rolling element bearing is designed for predominantly supporting the main vector component. In dependence on the deformation thus sensed, an attribute of the mechanical load is determined The feature "main vector component" as used herein refers to a predominant character of the mechanical load, which the rolling element bearing has been designed to support in operational use. For example, a radial bearing has been designed for only, or predominantly, supporting a radial load. Some types of radial bearings can accommodate some axial loads as well, such as angular-contact ball bearings and taper roller bearings. A thrust bearing, on the other hand, has been designed for supporting purely axial loads. For more background information, please see, e.g., "General Catalogue", SKF, November 2005, Chapter "Selection of bearing type", Section "Loads". Accordingly, the predominant vector component of the mechanical load on a radial bearing is assumed to be the radially directed vector component, i.e., perpendicular to the rotation axis of the radial bearing, whereas the predominant vector component of the mechanical load on an axial bearing is assumed to be the axially directed vector component, i.e., directed parallel to the rotation axis of the axial bearing.

The attribute of the mechanical load includes, e.g., a magnitude of the mechanical load, a direction of the mechanical load, a magnitude of the mechanical load in a particular direction with respect to the rolling element bearing, a temporal character of the magnitude or of the direction, etc.

The inventors have found that considerable strain variations occur at a sidewall of the outer ring of a radial bearing while monitoring strains conventionally measured at the cylindrical outer surface of the outer ring. Conventionally, the mechanical load on a rolling element bearing, e.g., a radial bearing, is determined by considering the deformation of the inner ring or of the outer ring of the radial bearing, at a surface that is subjected to surface stress or surface strain resulting from a combination of the mechanical load on the radial bearing and the reaction force of the radial bearing. In operational use of the rolling element bearing, the rolling elements pass in succession a specific location at the inner raceway or at the outer raceway. The resulting surface strain at the specific location has a temporal characteristic determined by the so-called ball-pass frequency. The invention is based on the insights that deformation also takes place in a direction that is different from the direction of the force that the mechanical load exerts on the rolling element bearing, e.g., the deformation in a direction perpendicular to the direction of the force arising from the mechanical load, and that this deformation is detectable and carries information about the mechanical load. Load sensing in accordance with the invention facilitates retro-fitting sensors to rolling element bearings that are already being used in existing applications, as the sensors can more easily be fitted to those surfaces of a rolling element bearing, that are oriented in a direction substantially different from, e.g., perpendicularly to, another direction of the force of the mechanical load on the rolling element bearing.

In an embodiment of the method, the rolling element bearing comprises a radial bearing. The first ring comprises: a first left flank substantially facing in an axial direction parallel to the axis; a first right flank opposite the first left flank and substantially facing in an opposite axial direction parallel to the axis; a first cylindrical surface between the first left flank and the first right flank, and facing a radial direction perpendicular to the axis; and a first raceway located between the first left flank and the first right flank and opposite the first cylindrical surface, and facing an opposite radial direction perpendicular to the axis. The second ring comprises: a second left flank substantially facing in the axial direction parallel to the axis; a second right flank substantially facing in the opposite axial direction parallel to the axis; a second cylindrical surface between the second left flank and the second right flank and facing the opposite radial direction; and a second raceway located between the first left flank and the first right flank opposite the second cylindrical surface, and facing the radial direction. The further direction of the mechanical load is substantially perpendicular to the axis. The specific surface is at least one of: the first left flank, the first right flank, the second left flank and the second right flank. The deformation sensed comprises at least one of a radial contribution to the deformation and a circumferential contribution to the deformation In this context, the term "flank" refers to a surface of the relevant one of the first ring and the second ring that faces in an axial direction.

The inventors have found that a radial bearing deforms under a mechanical load in a manner similar to the manner wherein a tire deforms on a wheel of a car driving over a road surface. The tire shows a more or less prominent bulge where the tire is in contact with the road surface at that moment. The bulge is formed by the sidewalls of the tire deforming outwards in the axial directions and by the tread of the tire being flattened where the tire is in contact with the road surface.

The inventors have found that depending on the magnitude of the load and the type of the radial bearing (size of the rings, size of the rolling elements, etc.) there are "sweet spots" on the flank where the axial deformation as a result of a radial load tends to be more pronounced than elsewhere. It turns out that for the types of radial bearings that were simulated on a computer and were tested in practice (among which were spherical roller bearings for radial loads), the deformation of the specific ring was more pronounced at locations that lie radially closer to the raceway of the specific ring than to the radially opposite cylindrical surface of the specific ring. The locations of the sweet spots depend on the contact angle of the rolling element, on the type of rolling element bearing and, therefore, on the distribution of forces of the mechanical load within the rings and the rolling elements of the type of rolling element bearing considered.

Instead of using strain gauges, other techniques can be used to sense a deformation of the relevant flank of the radial bearing. For example, an axial deformation of the flank occurs as a result of a mechanical load applied to the radial bearing in a direction perpendicular to the axis. The axial deformation brings about axial displacements at different locations on the surface of the flank, relative to the surface of the radial bearing in an unloaded state. This displacement could be detected using, for example, one or more capacitive displacement sensors known in the art. Capacitive displacement sensors can measure the position of an object down to the nanometer level. Alternatively, one could, in principle, use one or more inductive sensors, electromagnetic sensors or other types of proximity sensors if their resolution is sufficiently high. For example, one could use electronic speckle pattern interferometry for detecting a change in a laser speckle pattern generated on the flank the change being due to the deformation. The change is representative of the mechanical load.

As specified above, a strain gauge can be used to sense the deformation of the specific surface. A strain gauge has a finite size and, therefore, provides a sensor signal that is an average of the deformation in the area of the specific surface covered by the strain gauge.

The measuring of the load is based on using the temporal characteristic of the strain signal. The overall value of the load is obtained by calculating the standard deviation of the strain signal. Several of these overall values at different angular positions on the surface of the flank of the rolling element bearing can provide information about the distribution of the load across the loaded zone of the rolling element bearing. The size of the strain sensor is preferably as narrow as possible in the angular direction, i.e., in the direction wherein the rolling-elements traverse their path, so as to be able to properly capture the peak of the strain when individual ones of the rolling elements are passing by. In order to be less sensitive to radial movements of the "bulge", the strain sensor preferably covers a substantial distance in the radial direction.

The expression "loaded zone", as used above, refers to the region of the rolling element bearing that effectively carries the mechanical load. Consider, for example, a radial bearing whose outer ring is mounted in a housing, and whose inner ring is fixed to a horizontal shaft. The shaft is therefore enabled to rotate relative to the housing. Assume first that the shaft is not rotating, and is subjected to a mechanical load in the upward vertical direction. The mechanical load on the shaft causes the inner ring of the radial bearing to be pushed upwards against those among the rolling elements that are positioned in the upper half of the radial bearing. The rolling elements in the upper half are pushed, in turn, against the upper half of the outer ring of the radial bearing, as a result of which the outer ring is pushed vertically upwards against the housing. The housing is stationary and exerts a reaction force vertically downwards on the outer ring. The rolling elements in the lower half of the radial bearing will not experience any load, or a reduction in a load if the radial bearing was prestressed. The loaded zone in the outer ring is that material region in the outer ring that is subjected to the actual stresses as a result of the mechanical load on the shaft and that deforms as a result thereof. If the direction of the mechanical load on the shaft does not change, the location of the loaded zone relative to the outer ring of the radial bearing will not change. If the shaft is rotating while subjected to the mechanical load in the upward vertical direction, the location of the loaded zone does not change with respect to the outer ring, but the intensity of the deformation will now vary with the ball-pass frequency of the rolling elements, as each time other ones of the rolling elements pass through the upper half of the radial bearing.

In a further embodiment of a method in the invention applied to a radial bearing, the deformation sensed comprises the radial contribution. The sensing of the deformation comprises using a first strain gauge attached to the specific surface of the specific ring and a second strain gauge attached to the specific surface of the specific ring. An angular distance between the first strain gauge and the second strain gauge on the specific surface, and measured in a circumferential direction around the axis, is substantially equal to half of another angular distance between two adjacent ones of the rolling elements, measured in the circumferential direction. The first strain gauge and the second strain gauge are connected in a measuring bridge circuit of, e.g., the half-bridge type or of the full-bridge type.

This further embodiment is based on the insight that both positive radial strain and negative radial strain occur in the specific ring in a region, where a single one of the rolling elements currently makes a Hertzian contact with the raceway of the specific ring. A distance between the location of the positive strain and the other location of the negative strain corresponds with about half a spacing between adjacent rolling elements. If the first strain gauge and the second strain gauge are properly spaced, they will provide signals of opposite polarity that can be constructively combined in a half-bridge measuring circuit. Similarly, one can use a full-bridge measuring circuit, by placing four strain gauges with equidistant spacing of half the angular distance as occurs between two rolling elements that are adjacent to each other in the circumferential direction.

In a further embodiment of a method in the invention applied to a radial bearing, the deformation sensed comprises the circumferential contribution. The sensing of the deformation comprises using a strain gauge attached to the specific surface of the specific ring. The strain gauge has a sensing area whose width is substantially equal to half a spacing between a pair of the rolling elements that are adjacent in the circumferential direction.

Around the Hertzian contact area with a single one of the rolling elements, a positive circumferential strain and a negative circumferential strain can be observed. For a strain gauge this is only one direction. As known, a strain gauge only measures expansion and contraction, but not the direction thereof. Both the positive circumferential strain and the negative circumferential strain are expansions. Depending on the size of the measurement grid of the strain gauge, two peaks can be expected with each single passing of a rolling element.

If the width of the strain gauge patch is substantially equal to the areas wherein both a strain in the positive circumferential direction and the strain in the negative circumferential direction occur as a result of the passing of a single rolling element, then the strain output is doubled as the effects of both strains are summed in the output signal of the strain gauge.

In a further embodiment of the method of the invention, the method comprises sensing the deformation of the first ring on both the first left flank and the first right flank. The method further comprises determining at least one of: a difference between the deformation of the first ring as sensed on the first left flank and the deformation of the first ring as sensed on the first right flank; and a sum of the deformation of the first ring sensed on the first left flank and the deformation of the first ring sensed on the first right flank. The method further comprises determining the attribute of the mechanical load in dependence on the difference, if the attribute of the mechanical load is representative of an axial component of the mechanical load; and determining the attribute of the mechanical load in dependence on the sum if the attribute of the mechanical load is representative of a radial component of the mechanical load.

The inventors propose to determine an axial component of the mechanical load and to determine a radial component of the mechanical load by means of using different combinations of two strain measurements, one on each flank. The difference between the strain sensed on the left flank and the strain sensed on the right flank is representative of the current axial component of the mechanical load. The sum of the strain sensed on the first flank and the strain sensed on the second flank is representative of the current radial component of the mechanical load.

Alternatively, one may also try to individually determine the axial component of the mechanical load and the radial component of the mechanical load by sensing the strains at multiple locations along the circumference of a single flank of, e.g., the outer ring. A mathematical model of the load distribution on the rolling elements would be required to decouple radial and axial load.

Accordingly, a method of the invention allows determining also an axial component of the mechanical load on a radial bearing by sensing the strain on both flanks of a ring, determining a mechanical load vector in the plane of the ring by means of sensing the strain on a flank of a ring at multiple locations along the circumference of the ring, and determining a distribution of the mechanical load in the loaded zone by means of sensing the strain on a flank of a ring at multiple locations along the circumference of the ring.

In a further embodiment of a method of the invention, the rolling element bearing comprises an axial bearing. The first ring comprises a first left flank substantially facing in an axial direction parallel to the axis; a first right flank opposite the first left flank and substantially facing in an opposite axial direction parallel to the axis, and comprising a first raceway facing the plurality of rolling elements; at least one of a first outer cylindrical surface between the first left flank and the first right flank and facing outwards in a radial direction perpendicular to the axis and a first inner cylindrical surface between the first left flank and the first right flank and facing inwards in a radial direction perpendicular to the axis. The second ring comprises: a second left flank substantially facing in the axial direction parallel to the axis, and comprising a second raceway facing the plurality of rolling elements; a second right flank substantially facing in the opposite axial direction parallel to the axis; and at least one of a second outer cylindrical surface between the second left flank and the second right flank and facing outwards in the radial direction perpendicular to the axis and a second inner cylindrical surface between the second left flank and the second right flank and facing inwards in a radial direction perpendicular to the axis. The further direction of the mechanical load is substantially parallel to the axis. The specific surface is at least one of: the first outer cylindrical surface, the first inner cylindrical surface, the second outer cylindrical surface and the second inner cylindrical surface. The deformation sensed comprises at least one of an axial contribution to the deformation and a circumferential contribution to the deformation.

Accordingly, an approach can be taken similar to the one as discussed with reference to a radial bearing. That is, the deformation of the axial bearing is sensed at a specific surface of a specific one of the first ring and the second ring, that is facing in a direction substantially perpendicular to the further direction of the mechanical load.

The invention also relates to a radial bearing comprising: a first ring and a second ring that are configured for substantially coaxial rotation relative to each other around an axis, and a plurality of rolling elements accommodated between the first ring and the second ring. The first ring forms an outer ring of the radial bearing and the second ring forms an inner ring of the radial bearing. The first ring comprises: a first left flank substantially facing in an axial direction parallel to the axis; a first right flank opposite the first left flank and substantially facing in an opposite axial direction parallel to the axis; a first cylindrical surface between the first left flank and the first right flank and facing a radial direction perpendicular to the axis;

and a first raceway opposite the first cylindrical surface and located between the first left flank and the first right flank and facing an opposite radial direction perpendicular to the axis. The second ring comprises: a second left flank substantially facing in the axial direction parallel to the axis; a second right flank substantially facing in the opposite axial direction parallel to the axis; a second cylindrical surface between the second left flank and the second right flank and facing the opposite radial direction; and a second raceway opposite the second cylindrical surface and located between the first left flank and the first right flank and facing the radial direction. The radial bearing also comprises one or more deformation sensors for sensing, in operational use of the radial bearing, at least one of: a radial contribution to a deformation of the first ring, and a circumferential contribution to the deformation of at least the first ring, at a specific surface that is at least one of: the first left flank and the first right flank, the second left flank and the second right flank.

In a further embodiment of the radial bearing, the deformation sensed comprises the radial contribution. The deformation sensor comprises a first strain gauge attached to the specific surface of the specific ring and a second strain gauge attached to the specific surface of the specific ring. An angular distance between the first strain gauge and the second strain gauge on the specific surface, measured in a circumferential direction around the axis, is substantially equal to half of another angular distance between two adjacent ones of the rolling elements, measured in the circumferential direction.

The first strain gauge and the second strain gauge are configured for being connected in a bridge measuring circuit.

In a further embodiment of the radial bearing, the deformation sensed comprises the circumferential contribution. The deformation sensor comprises a strain gauge attached to the specific surface of the specific ring. The strain gauge has a sensing area whose width is substantially equal to half a spacing between a pair of the rolling elements that are adjacent in the circumferential direction. The strain gauge has an orientation so as to just cover a first region on the specific surface, wherein the circumferential contribution has a positive component, and a second region on the specific surface wherein the circumferential contribution has a negative component, the positive component and the negative component arising as a result of a single one of the rolling elements passing the strain gauge in operational use of the radial bearing.

The invention also relates to an axial bearing comprising: a first ring and a second ring that are configured for substantially coaxial rotation relative to each other around an axis, and a plurality of rolling elements accommodated between the first ring and the second ring. The first ring comprises: a first left flank substantially facing in an axial direction parallel to the axis; a first right flank opposite the first left flank and substantially facing in an opposite axial direction parallel to the axis, and comprising a first raceway facing the plurality of rolling elements; and a first cylindrical surface between the first left flank and the first right flank and facing outwards in a radial direction perpendicular to the axis. The second ring comprises a second left flank substantially facing in the axial direction parallel to the axis, and comprising a second raceway facing the plurality of rolling elements; a second right flank substantially facing in the opposite axial direction parallel to the axis; and a second cylindrical surface between the second left flank and the second right flank and facing outwards in the radial direction perpendicular to the axis. The axial bearing comprises a deformation sensor operative to sense, in operational use of the axial bearing, at least one of: an axial contribution to a deformation of at least one of: a specific one of the first ring and the second ring, and a circumferential contribution to the deformation of at least the specific ring, at a specific surface that is at least one of: the first cylindrical surface and the second cylindrical surface.

Note that in both the scenarios according to the invention of determining the load on a radial bearing and determining the load on an axial bearing, sensors may be fitted retroactively to the bearing in existing applications.

For completeness, reference is made to International Application published as WO 2010/072232, assigned to SKF and incorporated herein by reference. WO 2010/072232 relates to a bearing unit which enables a strong and stable strain signal to be sensed, whereby the sensor can be attached to the bearing in a straightforward automated process. The bearing is provided with one or more strain sensors. The bearing comprises an inner ring and an outer ring, and where the sensor comprises a sensing element integrated on a support member. The support member is a flat plate made of a metal material and is attached to a surface of the bearing only by means of a first weld seam and a second weld seam located at first and second lateral ends of the support member. WO 2010/072232 describes an embodiment wherein one or more sensors are attached to an end face of a radial bearing's inner ring in order to measure expansion of the inner ring as a result of mounting the radial bearing on a tapered seating. Such a mounting configuration causes the diameter of the inner ring to increase, which in turn affects the internal clearance of the bearing. An optimal internal clearance can therefore be achieved by sensing the strains induced on the end face of the inner ring as a result of the increased ring diameter during the mounting phase. In contrast therewith, the current invention relates to determining a mechanical load on, e.g., a radial bearing by determining a deformation of, e.g., an end face of the outer ring, and does so during the operational-use phase of the bearing. WO 2010/072232 neither provides a teaching, nor a suggestion, nor an incentive to the skilled person to use the sensors for sensing a deformation of the end face of at least one of the inner ring and the outer ring of a radial bearing, to determine a mechanical load on the radial bearing in operational use.

BRIEF DESCRIPTION OF THE DRAWINGS

Throughout the drawings, the same reference numerals indicate similar or corresponding features.

DETAILED EMBODIMENTS

Figure 1:
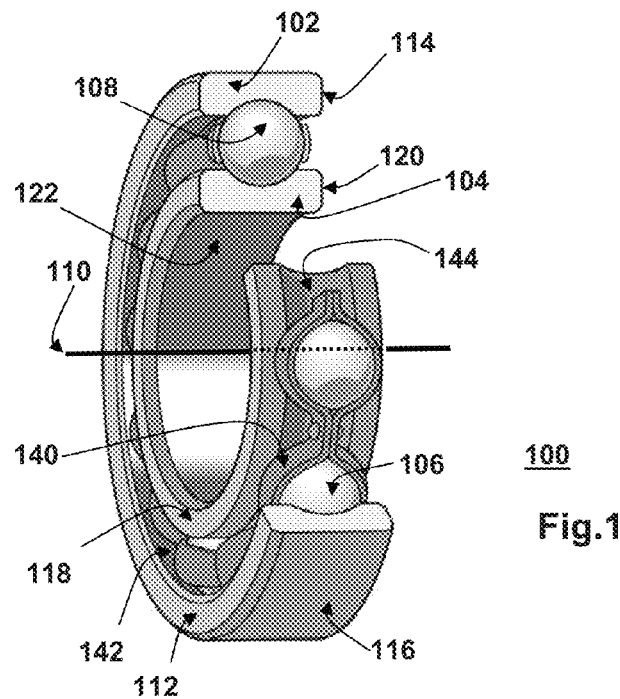
FIG. 1 is a diagram of a deep-groove ball-bearing.

FIG. 1 is a diagram of a first example of a radial bearing, namely, a deep-groove ball-bearing 100. The deep-groove ball-bearing 100 comprises a first ring 102, a second ring 104, and a plurality of balls accommodated between the first ring 102 and the second ring 104. Only a first ball 106 and a second ball 108 have been indicated with reference numerals in order to not obscure the drawing. Typically, the plurality of balls is retained in a cage 140 to ensure an even spacing of the balls in the angular direction. The first ring 102 and the second ring 104 are configured for substantially coaxial rotation relative to each other around an axis 110. The first ring 102 has a first ring-like cross-section (not shown) in a plane (not shown) perpendicular to the axis 110, and the second ring 104 has a second ring-like cross-section (not shown) in the same plane perpendicular to the axis 110. The first ring-like cross section and the second ring-like cross-section are concentric in the same plane. The deep-groove ball-bearing 100 is a radial bearing designed for supporting predominantly radial loads, i.e., loads that exert forces whose vectors lie substantially in a plane perpendicular to the axis 110.

The first ring 102 comprises a first left flank 112 substantially facing in an axial direction parallel to the axis 110, a first right flank 114 substantially facing in an opposite axial direction parallel to the axis 110, a first cylindrical surface 116 between the first left flank 112 and the first right flank 114 and facing radially outwards. A first radially inwards facing surface 142 of the first ring 102 comprises a first raceway. Likewise, the second ring 104 comprises a second left flank 118 substantially facing in the axial direction parallel to the axis 110, a second right flank 120 substantially facing in the opposite axial direction parallel to the axis 110, and a second cylindrical surface 122 between the second left flank and the second right flank and facing radially inwards. A second radially outwards facing surface 144 of the second ring 104 comprises a second raceway.

As is clear from the diagram of FIG. 1, the first ring 102 of the deep-groove ball-bearing 100 is the outer ring, and the second ring 104 is the inner ring of the deep-groove ball-bearing 100. Consider a configuration, wherein the first ring 102 is mounted in a housing (not shown) and the second ring 104 is mounted on a shaft (not shown). The first ring 102 is stationary with respect to the outside world, whereas the second ring 104 can freely rotate with the shaft with respect to the first ring 102, and therefore, with respect to the outside world. Assume that a load is applied to the housing in a vertically downwards direction in a plane perpendicular to the axis 110, and that the shaft exerts a reaction force vertically upwards so as to keep the position and orientation of the deep-groove ball-bearing 100 fixed with respect to the outside world. Accordingly, the housing exerts a pressure on an outer surface of the first ring 102 that varies with location on the outer surface, and the balls exert pressures on an inner surface of the first ring 102 that varies with location on the inner surface. The first ring 102 and specific ones of the balls, positioned in the upper half of the deep-groove ball-bearing 100, are pressed against each other. As both the first ring 102 and the balls are elastic, the first ring 102 and the balls deform as a result of the imposed load, and their contact area is increased with respect to their contact area when the load is absent. The deformation gives rise to stresses in the material of the first ring 102 and in the material of the specific balls. These stresses are referred to as the Hertzian contact stresses. The Hertzian contact stress forms the basis for modeling load bearing capabilities in rolling element bearings, gears, etc.

As has been discussed above, a mechanical load on the deep-groove ball-bearing 100 is conventionally determined by means of sensing a deformation of the first ring 102 at the first cylindrical surface 116 and/or sensing a further deformation of the second ring 104 at the second cylindrical surface 122. For example, a groove (not shown) is cut into the first cylindrical surface 116 and one or more strain gauges (not shown) are then accommodated in this groove before the deep-groove ball-bearing is positioned for operational use in a piece of machinery. Disadvantages of the conventional approach have been mentioned above.

In contrast, a method of determining a mechanical load on the deep-groove ball-bearing 100 according to the invention, is based on sensing a deformation of the first ring 102 at at least one of the first left flank 112 and the first right flank 114, and/or a further deformation of the second ring 104 at at least one of the second left flank 118 and the second right flank 120. That is, in the invention, the deformation of the first ring 102 and/or the second ring 104 is sensed at a surface that faces in a direction substantially different from the direction, along which the first ring 102 and the second ring 104 are pressed towards each other via the plurality of the rolling elements due to the mechanical radial load on the deep-groove ball-bearing 100. Here, the force of the load is oriented in a plane substantially perpendicular to the axis 110, whereas the surface whose deformation is sensed faces in a direction parallel to the axis 110.

For completeness, it is remarked here that configurations, other than the one above, are feasible wherein, for example, the first ring 102 can freely rotate with respect to the outside world and the second ring 104 is kept stationary with respect to the outside world, or wherein both the first ring 102 an the second ring 104 rotate coaxially relative to one another around the axis 110 and rotate both relative to the outside world. In both of these other configurations, the deformation of the first ring 102 can likewise be sensed on the first left flank 112 and/or on the first right flank 114, and/or the further deformation of the second ring 104 can be sensed at the second left flank 118 and/or the second right flank 120.

If the loaded zone of the deep-groove ball-bearing remains stationary with respect to the relevant one(s) of the first ring 102 and the second ring 104 whose deformation is sensed, it will suffice to use deformation sensors in the loaded zone only, on the relevant one(s) of the first left flank 112, the first right flank 114, the second left flank 118 and the second right flank 120. If the loaded zone does not remain stationary with respect to the relevant one(s) of the first ring 102 and the second ring 104, the loaded zone changes location relative to the relevant one(s) of the first ring 102 and the second ring 104. For example, the location of the loaded zone traverses a circle centered on the axis 110. One may then locate the deformation sensors so as to sense the deformation at particular locations all around the relevant one(s) of the flank(s). If the location of the loaded zone oscillates between two extreme positions within the relevant one(s) of the first ring 102 and the second ring 104, and runs back and forth along an arc, one may locate the deformation sensors so as to sense the deformation at particular locations on this arc at the relevant flank(s). Alternatively, if the loaded zone is not stationary with respect to the relevant one(s) of the first ring 102 and the second ring 104, but changes position one may rely on the deformations sensors loaded zone one of the past the deformation sensors.

Figure 2:
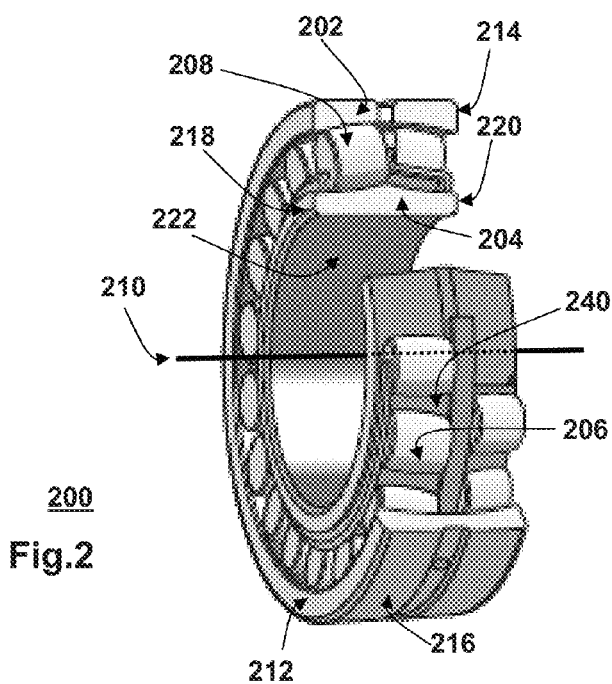
FIG. 2 is a diagram of a spherical roller bearing.

FIG. 2 is a diagram of a second example of a radial bearing, namely, a spherical roller bearing 200. A typical spherical roller bearing has two rows of rollers with a common sphered raceway in the outer ring and two raceways in the inner ring that are inclined at an angle to the bearing's axis. Spherical roller bearings are self-aligning, and are designed to accommodate heavy radial loads as well as heavy axial loads. The spherical roller bearing 200 comprises a first ring 202, a second ring 204, and a plurality of rolling elements, here: a plurality of rollers, accommodated between the first ring 202 and the second ring 204. Only a first roller 206 and a second roller 208 have been indicated with reference numerals in order to not obscure the drawing. Typically, the rollers are retained in a cage 240 to ensure an even spacing of the plurality of rollers in the angular direction. The first ring 202 and the second ring 204 are configured for substantially coaxial rotation relative to each other around an axis 210. The first ring 202 has a first circular, ring-like cross-section (not shown) in a plane (not shown) perpendicular to the axis 210, and the second ring 204 has a second circular, ring-like cross-section (not shown) in the same plane perpendicular to the axis 210. The first ring-like cross section and the second ring-like cross-section are concentric in the same plane. The spherical roller bearing 200 is designed for supporting radial loads, i.e., loads that exert forces whose vectors substantially lie in a plane perpendicular to the axis 210, as well as axial loads, i.e., loads that exert forces whose vectors are parallel to the axis 210.

The first ring 202 comprises a first left flank 212 substantially facing in an axial direction parallel to the axis 210, a first right flank 214 substantially facing in an opposite axial direction parallel to the axis 210, and a first cylindrical surface 216 between the first left flank 212 and the first right flank 214. The first cylindrical surface 216 faces radially outwards. A first radially inwards facing surface (not indicated with a reference numeral) of the first ring 202 comprises a first raceway that is common to the two rows of rollers. The second ring 204 comprises a second left flank 218 substantially facing in the axial direction parallel to the axis 210, a second right flank 220 substantially facing in the opposite axial direction parallel to the axis 210, and a second cylindrical surface 222 between the second left flank 218 and the second right flank 220. The second cylindrical surface 216 faces radially inwards. A second radially outwards facing surface (not indicated with a reference numeral) of the second ring 204 comprises a pair of second raceways. A surface of a specific one of the pair of raceways has a specific normal vector that points away from a direction that is perpendicular to the axis 210.

As is clear from the diagram of FIG. 2, the first ring 202 of the spherical roller bearing 200 is the outer ring, and the second ring 204 is the inner ring of the spherical roller bearing 200. Consider a configuration, wherein the spherical roller bearing 200 is mounted in a housing (not shown) with the first ring 202, and with the second ring 204 mounted on a shaft (not shown). The first ring 202 is stationary with respect to the outside world, whereas the second ring 204 can freely rotate with the shaft with respect to the first ring 202, and therefore, with respect to the outside world. Assume that a load is applied to the housing in a vertically downwards direction in a plane perpendicular to the axis 210, and that the shaft exerts a reaction force vertically upwards so as to keep the position and orientation of the spherical roller bearing 200 fixed with respect to the outside world. Accordingly, the housing exerts a pressure on an outer surface of the first ring 202 that varies with location on the outer surface, and the spherical rollers exert pressures on an inner surface of the first ring 202 that varies with location on the inner surface. The first ring 202 and specific ones of the rollers, positioned in the upper half of the spherical roller bearing 200, are pressed against each other. As both the first ring 202 and the rollers are elastic, the first ring 202 and the rollers deform as a result of the imposed load, and their contact area is increased with respect to their contact area when the load is absent. The deformation gives rise to stresses in the material of the first ring 202 and in the material of the specific rollers.

As has been discussed above, a mechanical load on the spherical roller bearing 200 is conventionally determined by means of sensing a deformation of the first ring 202 at the first cylindrical surface 216 and/or sensing a further deformation of the second ring 204 at the second cylindrical surface 222. Disadvantages of the conventional approach have been mentioned above.

In contrast, a method of determining a mechanical load on the spherical roller bearing 200 according to the invention, is based on sensing a deformation of the first ring 202 at at least one of the first left flank 212 and the first right flank 214, and/or a further deformation of the second ring 204 at at least one of the second left flank 218 and the second right flank 220. That is, in the invention, the deformation of the first ring 202 and/or the second ring 204 is sensed at a surface that faces in a direction substantially different from the direction, along which the first ring 202 and the second ring 204 are pressed towards each other via the plurality of the cylindrical rollers due to a radially directed mechanical load on the spherical roller bearing 200. Here, the load is oriented in a direction that lies in a plane substantially perpendicular to the axis 210, whereas the surface whose deformation is sensed faces in a direction parallel to the axis 210.

Figure 3:
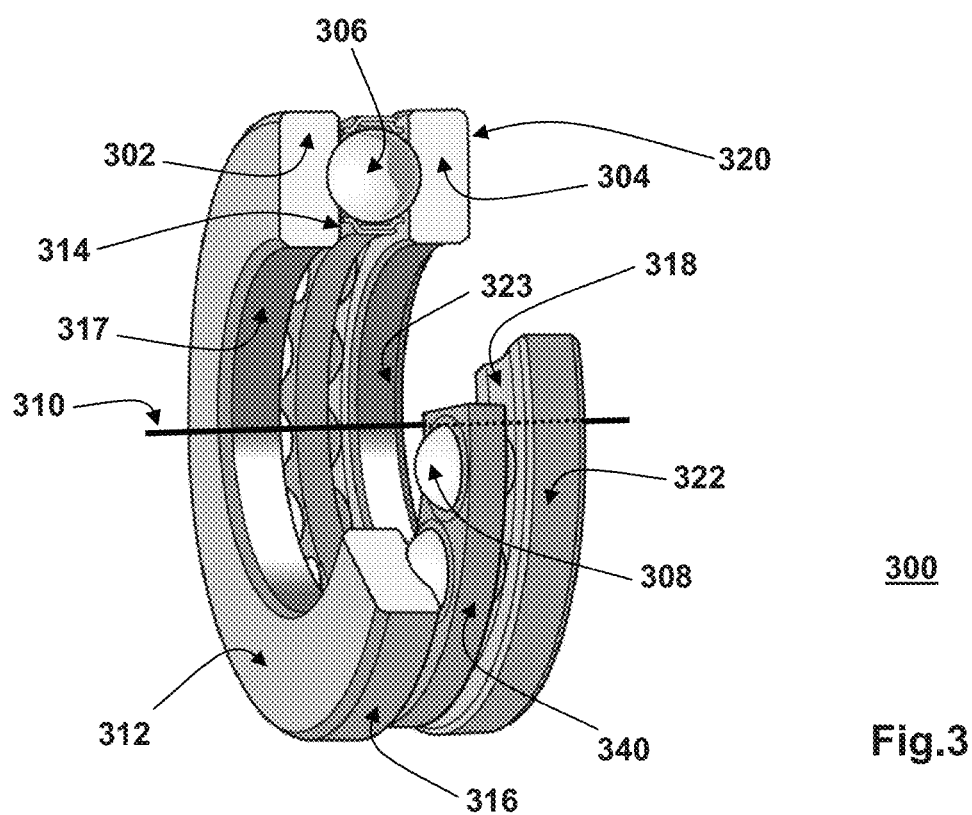
FIG. 3 is a diagram of an axial bearing.

FIG. 3 is a diagram of a third example of a rolling element bearing, namely an axial bearing 300. The axial bearing 300 comprises a first ring 302, a second ring 304, and a plurality of rolling elements between the first ring 302 and the second ring 304. The rolling elements of a thrust bearing may be shaped as balls or as rollers. For more background information, please see, e.g., "General Catalogue", SKF, November 2005, Chapter "Selection of bearing type", Section "Loads". By way of example, rolling elements of the axial bearing 300 are shaped here as balls. Only a first ball 306 and a second ball 308 have been indicated with individual reference numerals in order to not obscure the drawing. Typically, the plurality of balls is retained in a cage 340 to ensure an even spacing of the balls in the angular direction. The first ring 302 and the second ring 304 are configured for substantially coaxial rotation relative to each other around an axis 310. The first ring 302 and the second ring are coaxially positioned, but are spaced a distance apart in the axial direction. The axial bearing 300 is designed for supporting axial loads, i.e., loads that exert forces whose vectors are substantially aligned with the axis 310.

The first ring 302 comprises a first left flank 312 substantially facing in an axial direction parallel to the axis 310, and away from the plurality of balls. The first ring 302 also has a first right flank 314 substantially facing in the opposite axial direction and facing the plurality of balls. The first right flank 314 comprises a first raceway (not indicated with a reference numeral here). The first ring 302 further has a first outer cylindrical surface 316, between the first left flank 312 and the first right flank 314 and facing radially outwards. The first ring 302 also has a first inner cylindrical surface 317, between the first left flank 312 and the first right flank 314 and facing radially inwards. Likewise, the second ring 304 comprises a second left flank 318 substantially facing in the axial direction parallel to the axis 310 and facing the plurality of balls, a second right flank 320 facing in the opposite axial direction and away from the plurality of balls, a second outer cylindrical surface 322 between the second left flank 318 and the second right flank 320 that is facing radially outwards, and a second inner cylindrical surface 323, between the second left flank 318 and the second right flank 320 and facing radially inwards. The second right flank 318 comprises a second raceway (not indicated here with a reference numeral). The diagram of FIG. 3 shows an example of an axial bearing wherein the first ring 302 has a first cylindrical inner surface 317 and wherein the second ring 304 has a second cylindrical inner surface 323. Instead of having cylindrical surfaces that face radially inwards, one or both of the first ring 302 and the second ring 304 can be formed as a solid disk having only a single cylindrical surface between the relevant left flank and right flank and facing radially outwards.

When an axial load is applied to the axial bearing 300 in operational use of the axial bearing 300, the first ring 302 and the second ring 304, and the plurality of balls in between, are being pressed together in an axial direction. As a result, the first ring 302, the second ring 304 and the plurality of balls are elastically deformed in dependence on the magnitude of the axial load. The first left flank 312 of the first ring 302 and the second right flank 320 of the second ring 304 are typically designed to spread the axial load over their entire surface, so as to avoid local peak loads and so as to minimize the pressure. That is, the first left flank 312 of the first ring 302 and the second right flank 320 of the second ring 304 are not readily accessible in operational use of the axial bearing 300 for sensing their deformation. In the invention, the deformation of the axial bearing 300 is sensed in operational use of the axial bearing 300 at the first cylindrical surface 316 and/or the second cylindrical surface 318. That is, the deformation is sensed at a surface of the first ring 302 and/or at a surface of the second ring 304 that face in a direction substantially perpendicular to a direction of the axial load.

Figure 4:
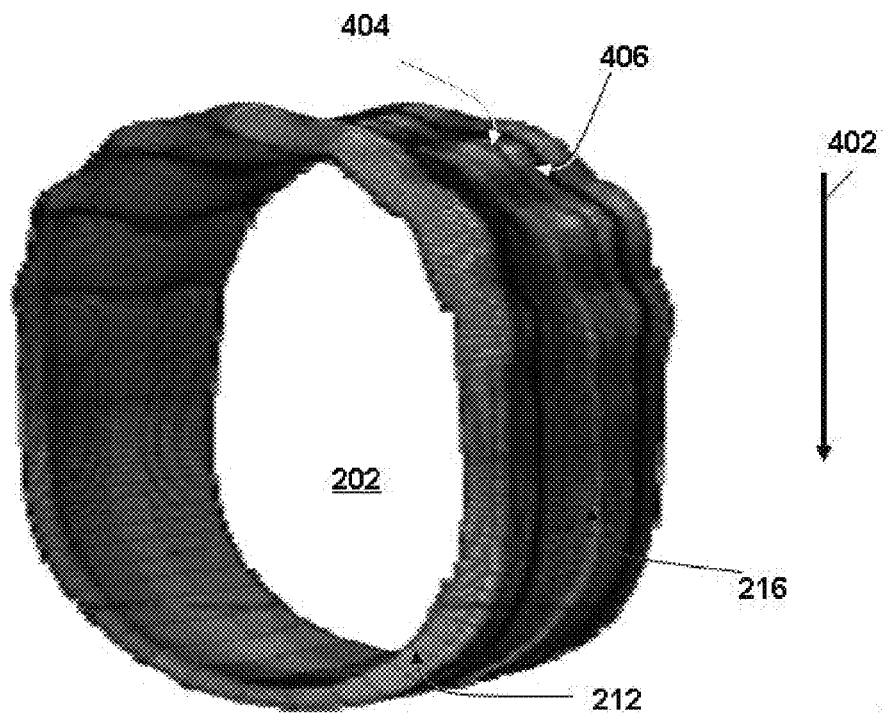
FIG. 4 is a diagram of a model of the first ring of the spherical roller bearing under a mechanical load.

FIG. 4 is a diagram of a model of the first ring 202 of the spherical roller bearing 200, obtained through a computer simulation of the spherical roller bearing 200 that, in operational use, experiences a mechanical load. The mechanical load exerts a force on the spherical roller bearing 200 in a direction of the arrow 402.

In the model in FIG. 4, seven rollers in the upper portion of the spherical roller bearing 200 are pressed against the raceway of the radially inwards facing surface of the first ring 202 in the upper half of the first ring 202, as a result of the mechanical load and the reaction forces. Note that the number of rolling elements, here: the rollers, that press against the raceway as a result of the applied mechanical load, depends on the type of rolling element bearing (e.g., dimensions of the rolling elements and of the raceway, the spacing between the rolling elements, whether the rolling element bearing has a single row or more rows of rolling elements, etc.), on the clearance of the bearing, on the housing in which the bearing is located, and on the magnitude and direction of the mechanical load. The pressure exerted on the raceway by the seven rollers in the upper portion of the cylindrical spherical roller bearing 200 gives rise to local deformations of the first ring 202. The local deformations are defined by the deviation from the shape of the first ring 202 in case the load is absent, and are shown somewhat exaggerated for clarity. Roughly speaking, the first cylindrical surface 216 in the upper half of the first ring 202 assumes an undulating shape with crests and troughs in an alternating sequence running in an angular direction. A single one of the crests is indicated with a reference numeral 404 and a single one of the troughs is indicated with a reference numeral 406 in order to not obscure the drawing. However, the first left flank 212 and the first right flank 214 (not labeled here) are deformed as well. The deformation of the first left flank 212 and the first right flank 214 is brought about by a rearrangement of the microstructure of the material of the first ring 202 at the atomic level, in response to the stresses in the material created by the rollers pushing against the raceway of the first ring 202.

Typically, the material is a metal alloy with a solid-phase microstructure held together by electrostatic interactions between a lattice of ions and a cloud of electrons. If the lattice is locally subjected to an impact with a foreign object, such as a roller passing by a certain location on the raceway of the first ring 202, disturbances propagate from the impact location throughout the lattice. The disturbances are elastic waves characterized by excursions made by the ions from their current equilibrium positions in the lattice. If the waves propagate much faster than the impact changes its location at the surface of the material and/or its intensity, the lattice assumes a new equilibrium at each moment on the time scale of the impact. The new equilibrium is determined by the forces of the impact currently applied at the surface of the first ring 202, the reaction forces on the first ring 202 currently caused by the rollers and the elasticity of the material. The new equilibrium is a global effect within the first ring 202, rather than a local effect, owing to the high stiffness of the material. Accordingly, a force locally applied to the first ring 202 gives rise to a global deformation of the first ring 202, including deformation of the first left flank 212 and the first right flank 214. It is these deformations of the first left flank 212 and the first right flank 214 that are sensed in a method of the invention in order to determine an attribute of the mechanical load applied in a direction perpendicular to the axis 210. Note that if the rolling element bearing is spinning and the mechanical load remains constant in magnitude and direction, the deformations assume a temporally repetitive character at the frequency of the ball-pass frequency.

Figure 5:
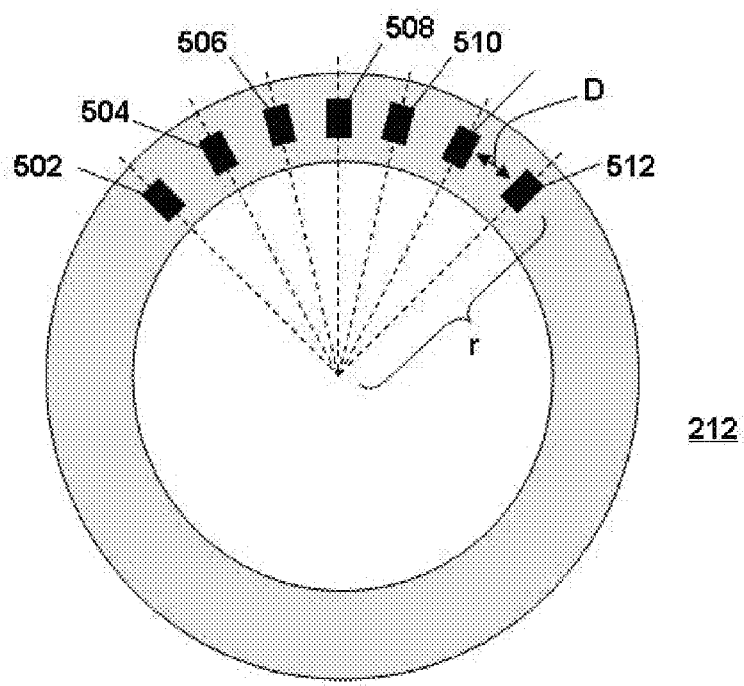
FIG. 5 is a diagram of a flank of the spherical roller bearing provided with strain gauges.

The deformation of the first left flank 212 will now be considered in more detail with reference to FIG. 5. Similar considerations will apply to the deformation of the first right flank 214 and will not be discussed further.

FIG. 5 is a diagram of the first left flank 212. The deformation is measured at multiple locations on the first left flank 212 in the upper half of the spherical roller bearing 200. The deformation at a specific one of these locations has a radial component, a circumferential component and an axial component. In a test, seven strain gauges: a first strain gauge 502, a second strain gauge 504, a third strain gauge 506, a fourth strain gauge 508, a fifth strain gauge 510, a sixth strain gauge 512 and seventh strain gauge 514 were positioned on the first left flank 212 in the upper half of the spherical roller bearing 200. These seven strain gauges were positioned at a substantially identical radial distance "r" from the axis 210, and with substantially equal circumferential distance "D" between neighboring ones of the seven strain gauges.

If the mechanical load on the spherical roller bearing 200 is constant and the first ring 202 and the second ring 204 are rotating relative to one another, the magnitude of a respective signal from a respective one of the seven strain gauges will vary periodically between a respective maximum value and a respective minimum value, each next period being indicative of the passing of a next one of the plurality of rollers.

Figure 6:
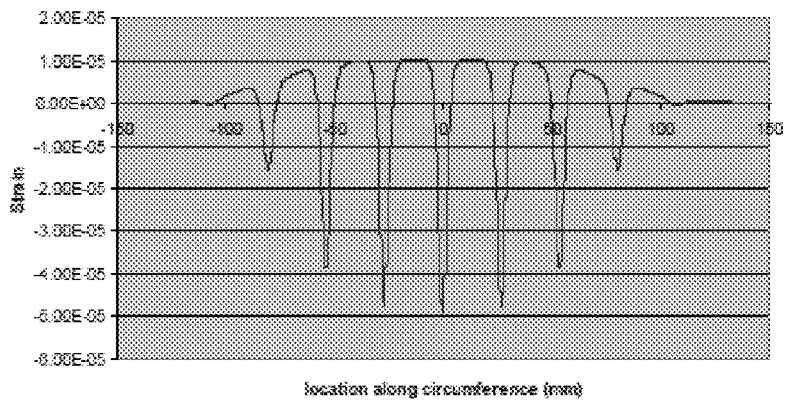
FIGS. 6, 7, 8 and 9 are diagrams illustrating the dependence of the strain signal on the circumferential positions of the strain gauges at certain positions of the set of rollers.
Figure 7:
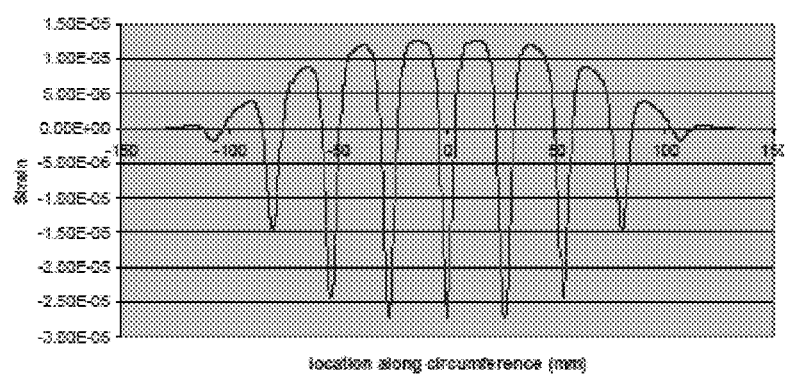
Figure 8:
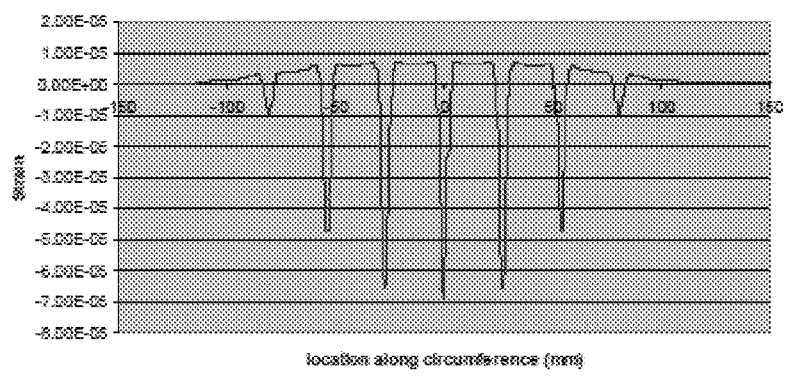

FIGS. 6, 7 and 8 are diagrams illustrating the radial component of the deformation (strain) of the first left flank in dependence on the position along a path on the surface of the first left flank 212 that traverses the locations of the seven strain gauges. The signals of the seven strain gauges are representative of the deformation of the first ring 202. The radial component of the strain, i.e., the radial strain, is the deformation of the first ring 202 in a radial direction.

The diagrams of FIGS. 6, 7 and 8 were obtained from computer simulations, and respective ones of the diagrams describe the strain in the radial direction determined for respective radii "r" (respective distances from the axis 210 of the spherical roller bearing 200) of the circumferential path on the first left flank 212 of the first ring 202 (i.e., the outer ring). The curves in the diagrams of FIGS. 6, 7 and 8 are representations of the simulated strain in the radial direction as determined along the circumference of the path from −150° to +150°, with 0° corresponding with the location of the highest point of the path. Owing to the fixed location of the strain gauges 502-512 to the fact that the rollers are passing by at the ball-pass frequency, the strain signal itself represents a spatial section of half the spacing between adjacent ones of the rollers, and has a more or less continuously varying amplitude.

The diagram of FIG. 6 represents the strain at different locations along the path at a radial distance $r=R_0$. In the example shown, the maximum top-top radial strain measured is the top-top radial strain measured at the location in the center (at about 0°), and is about 60 µε (µm/m).

The diagram of FIG. 7 represents the strain at different locations along the path at a radial distance $r=R_0+\delta$, wherein $\delta$ is larger than zero but much smaller than $R_0$ ($0<\delta\ll R_0$). The maximum top-top radial strain measured at the radial distance $R_0+\delta$ is now about 40 µε, well down by some 30% from the 60 µε in the diagram of FIG. 6.

The diagram of FIG. 8 represents the strain at different locations along the path at a radial distance $r=R_0-\delta$. The maximum top-top radial strain measured at the radial distance $R_0-\delta$ is now about 75 µε, well up by some 25% from the 60 µε in the diagram of FIG. 6.

The simulations, whose results are given in the diagrams of FIGS. 6, 7 and 8, support the finding that the top-top radial strain measurement is highly sensitive to a small variation in the radial distance "r", and that, for a spherical roller bearing designed for supporting a radial load, the strain is preferably measured at a radial distance closer to the radial distance of the raceway of the first ring 202 to the axis 210 than to the radial distance of the first cylindrical surface 216 to the axis 210.

Figure 9:
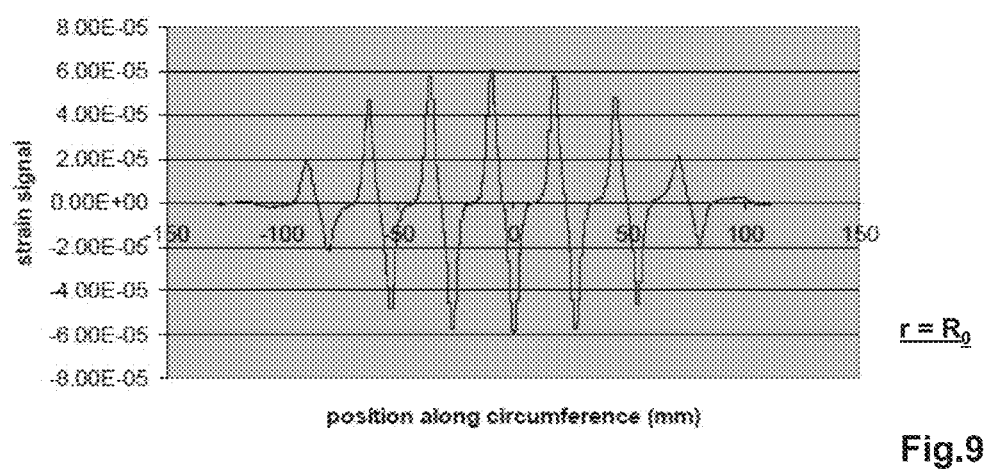

FIG. 9 is a diagram of a simulated measurement output of a combination of two strain gauges connected in a half-bridge measurement circuit. The strain gauges are positioned on a path with the radius $r=R_0$ and at locations on this path that are circumferentially spaced apart by half the circumferential distance between two adjacent rollers in the spherical roller bearing 200.

Quarter-bridge strain gauge circuits, half-bridge strain gauge circuits, and full-bridge strain gauge circuits are well known in the art. A particular one of the two strain gauges will then be exposed to the opposite of the forces to which the other one of the two strain gauges will be exposed. As a result, the half-bridge strain gauge circuit produces a combined radial strain signal with a maximum top-top value that is twice the top-top value in the radial strain signal of a single strain gauge. In addition, the half-bridge strain gauge circuit compensates the combined radial strain signal for dependencies of the strain gauge signals on temperature. In the example shown in the diagram of FIG. 9, the combined radial strain signal is symmetric and has a maximum amplitude of about 60 μɛ, and therefore a maximum top-top value of about 120 μɛ.

The method of the invention was tested with specific types of the spherical roller bearing 200. In the tests the radial strain was determined by means of sensing the deformation of the first ring 202 on the first left flank 212 with a pair of strain gauges at the top of the loaded zone of the spherical roller bearing 200 and spaced apart by half the distance between two adjacent rollers. The pair of strain gauges was connected in a half-bridge strain gauge circuit, the result of which is given in the diagram of FIG. 9. The results, obtained via a method of the invention, were compared to other strain signals, obtained by means of conventionally determining the radial deformation of the first ring 202 in a groove made in the first cylindrical surface 216. For the specific types of the spherical roller bearing 200 considered, it turned out that a magnitude of the radial strain signals, obtained in the invention, was about 10% of the magnitude of the other strain signals, that were obtained via the conventional method of sensing the radial strain in the groove made in the first cylindrical surface 216.

In tests, it also turned out that the magnitude of the radial strain, measured on the first left flank 212 in operational use of particular types of the spherical roller bearing 200, depended non-linearly on the magnitude of the radial mechanical load applied to the spherical roller bearing 200. The magnitude of the radial strain decreased with lower magnitudes of the radial mechanical load.

Accordingly, the magnitude of the radial strain signals obtained in accordance with the invention is well within a useful range in order to derive information about the mechanical load on a spherical roller bearing in operational use.

Instead of, or in addition to, sensing the radial strain, a circumferential strain can be sensed on the first left flank 212 of the first ring 202 of the spherical roller bearing 200. The circumferential strain, or the angular strain, is the component of the strain measured in the angular direction, i.e., at a segment of a circle, whose center lies on the axis 210 and whose orientation is perpendicular to the axis 210.

In tests, it was found that in the circumferential direction the strain amplitudes were lower than in the radial direction, discussed above. For example, measuring the circumferential strain at the first left flank 212 of a specific type of spherical roller bearing 200 under a specific load produces a two-sided wave of an amplitude of, e.g., 40 μɛ, whereas the measuring of the radial strain at the first left flank 212 of the same spherical roller bearing 200 under the same load produces a wave of a half sine type with a top-top value of, e.g., 80 μɛ. Furthermore, when connecting the two strain gauges in a half-bridge measurement circuit for measuring the circumferential strain, the placement of the strain gauges is more critical than in the case of measuring radial strain, and for the circumferential strain the output signal of the half-bridge measurement circuit deviates more from a sinusoidal wave than does the output signal for measuring the radial strain. In an area on the surface of the first left flank 212, wherein the strain was caused by a particular one of the plurality of rollers, a positive circumferential strain and a negative circumferential strain were observed occurring next to each other. Both a positive component of the circumferential strain and a negative component of the circumferential strain occur around the area of Hertzian contact of a single rolling element with the raceway of the first ring 202. For a strain gauge this is only one direction. Depending on the size of the measurement grid of the strain gauge, two peaks occur in the sensor signal produced by the strain gauge at each roller pass. If the strain gauge measurement grid is long enough in the circumferential direction, then the magnitude of the sensor signal is doubled. It was also found in the tests that the circumferential strain of the first ring 202 is most pronounced close to the raceway of the first ring 202.

The invention claimed is:

1. A method of determining a mechanical load on a rolling element bearing, the rolling element bearing comprising:
   a first ring and a second ring that are configured for coaxial rotation relative to each other and around an axis, wherein the first ring includes a first left flank and a first right flank, wherein the second ring includes a second left flank and a second right flank, the first left flank and the second left flank being disposed along a first plane oriented perpendicular to an axis of rotation of the rolling element bearing, the first right flank and the second right flank being disposed along a second plane oriented perpendicular to the axis of rotation;
   a plurality of rolling elements disposed between the first ring and the second ring; the method comprising:
   in operational use of the rolling element bearing, sensing a deformation of at least a specific one of the first ring and the second ring at at least a specific surface of the first ring or the second ring that faces in a direction substantially perpendicular to a further direction of a main vector component of the mechanical load on the rolling element bearing, wherein the rolling element bearing is designed for predominantly supporting the main vector component; wherein,
   sensing a deformation by only sensing a single specific surface of at least one of the first ring and the second ring, and
   determining an attribute of the mechanical load in dependence on the deformation sensed.

2. The method of claim 1, wherein:
   the rolling element bearing further comprises a radial bearing;
   the first ring comprises:
   a first left flank substantially facing in an axial direction parallel to the axis;
   a first right flank opposite the first left flank and substantially facing in an opposite axial direction parallel to the axis;
   a first cylindrical surface disposed between the first left flank and the first right flank and facing a radial direction perpendicular to the axis; and a first raceway opposite the first cylindrical surface and located between the first left flank and the first right flank and facing an opposite radial direction perpendicular to the axis;

the second ring comprises:
  a second left flank substantially facing in the axial direction parallel to the axis;
  a second right flank substantially facing in the opposite axial direction parallel to the axis;
  a second cylindrical surface between the second left flank and the second right flank and facing the opposite radial direction; and
  a second raceway opposite the second cylindrical surface and located between the first left flank and the first right flank and facing the radial direction;

the further direction of the main vector component of the mechanical load is substantially perpendicular to the axis;

the specific surface is at least one of: the first left flank, the first right flank, the second left flank and the second right flank; and wherein the deformation sensed comprises includes at least one of a radial contribution to the deformation and a circumferential contribution to the deformation.

3. A method of determining a mechanical load on a rolling element bearing, the rolling element bearing comprising:
  a first ring and a second ring that are configured for coaxial rotation relative to each other and around an axis; and
  a plurality of rolling elements disposed between the first ring and the second ring; the method comprising:
  in operational use of the rolling element bearing, sensing a deformation of at least a specific one of the first ring and the second ring at at least a specific surface of the first ring or the second ring that faces in a direction substantially perpendicular to a further direction of a main vector component of the mechanical load on the rolling element bearing, wherein the rolling element bearing is designed for predominantly supporting the main vector component;
  determining an attribute of the mechanical load in dependence on the deformation sensed, wherein:
  the rolling element bearing further comprises a radial bearing;
  the first ring comprises:
    a first left flank substantially facing in an axial direction parallel to the axis;
    a first right flank opposite the first left flank and substantially facing in an opposite axial direction parallel to the axis;
    a first cylindrical surface disposed between the first left flank and the first right flank and facing a radial direction perpendicular to the axis; and
    a first raceway opposite the first cylindrical surface and located between the first left flank and the first right flank and facing an opposite radial direction perpendicular to the axis;
  the second ring comprises:
    a second left flank substantially facing in the axial direction parallel to the axis;
    a second right flank substantially facing in the opposite axial direction parallel to the axis;
    a second cylindrical surface between the second left flank and the second right flank and facing the opposite radial direction; and
    a second raceway opposite the second cylindrical surface and located between the first left flank and the first right flank and facing the radial direction;

the further direction of the main vector component of the mechanical load is substantially perpendicular to the axis;

the specific surface is at least one of: the first left flank, the first right flank, the second left flank and the second right flank; and wherein the deformation sensed comprises includes at least one of a radial contribution to the deformation and a circumferential contribution to the deformation, the deformation sensed includes the radial contribution;

the sensing of the deformation provides using a first strain gauge attached to the specific surface of the specific ring and a second strain gauge attached to the specific surface of the specific ring;

an angular distance between the first strain gauge and the second strain gauge on the specific surface, and measured in a circumferential direction around the axis, is substantially equal to half of another angular distance between two adjacent ones of the rolling elements, measured in the circumferential direction; and the first strain gauge and the second strain gauge are connected in a bridge measuring circuit.

4. The method of claim 3, wherein:
the deformation sensed includes the circumferential contribution;
the sensing of the deformation includes using a strain gauge attached to the specific surface of the specific ring; and
the strain gauge has a sensing area whose width is substantially equal to half a spacing between a pair of the rolling elements that are adjacent in the circumferential direction.

5. The method of claim 4, comprising:
sensing the deformation of the first ring on both the first left flank and the first right flank;
determining at least one of:
  a difference between the deformation of the first ring sensed on the first left flank and the deformation of the first ring sensed on the first right flank; and
  a sum of the deformation of the first ring sensed on the first left flank and the deformation of the first ring sensed on the first right flank;
determining the attribute of the mechanical load in dependence on the difference if the attribute of the mechanical load is representative of an axial component of the mechanical load; and
determining the attribute of the mechanical load in dependence on the sum if the attribute of the mechanical load is representative of a radial component of the mechanical load.

6. A method of determining a mechanical load on a rolling element bearing, the rolling element bearing comprising:
  a first ring and a second ring that are configured for coaxial rotation relative to each other and around an axis; and
  a plurality of rolling elements disposed between the first ring and the second ring; the method comprising:
  in operational use of the rolling element bearing, sensing a deformation of at least a specific one of the first ring and the second ring at at least a specific surface of the first ring or the second ring that faces in a direction substantially perpendicular to a further direction of a main vector component of the mechanical load on the rolling element bearing, wherein the rolling element bearing is designed for predominantly supporting the main vector component; and determining an attribute of the mechanical load in dependence on the deformation sensed, wherein the rolling element bearing comprises an axial bearing;

the first ring further comprising:
- a first left flank substantially facing in an axial direction parallel to the axis;
- a first right flank opposite the first left flank and substantially facing in an opposite axial direction parallel to the axis, and having a first raceway facing the plurality of rolling elements;
- at least one of a first outer cylindrical surface disposed between the first left flank and the first right flank and facing outwards in a radial direction perpendicular to the axis and a first inner cylindrical surface located between the first left flank and the first right flank and facing inwards in a radial direction perpendicular to the axis; and the second ring further comprising:
- a second left flank substantially facing in the axial direction parallel to the axis, and comprising a second raceway facing the plurality of rolling elements;
- a second right flank substantially facing in the opposite axial direction parallel to the axis; and
- at least one of a second outer cylindrical surface between the second left flank and the second right flank and facing outwards in the radial direction perpendicular to the axis and a second inner cylindrical surface located between the second left flank and the second right flank and facing inwards in a radial direction perpendicular to the axis; and the further direction of the mechanical load is substantially parallel to the axis;

the specific surface is at least one of: the first outer cylindrical surface, the first inner cylindrical surface, the second outer cylindrical surface and the second inner cylindrical surface; and the deformation sensed providing at least one of an axial contribution to the deformation and a circumferential contribution to the deformation.

7. A radial bearing comprising:
a first ring and a second ring that are configured for substantially coaxial rotation relative to each other around an axis (110; 210); and
a plurality of rolling elements accommodated between the first ring and the second ring;
the first ring forms an outer ring of the radial bearing and the second ring forms an inner ring of the radial bearing;
the first ring comprising:
- a first left flank substantially facing in an axial direction parallel to the axis;
- a first right flank opposite the first left flank and substantially facing in an opposite axial direction parallel to the axis;
- a first cylindrical surface disposed between the first left flank and the first right flank and facing a radial direction perpendicular to the axis; and
- a first raceway opposite the first cylindrical surface and located between the first left flank and the first right flank and facing an opposite radial direction perpendicular to the axis;

the second ring comprising:
- a second left flank substantially facing in the axial direction parallel to the axis;
- a second right flank substantially facing in the opposite axial direction parallel to the axis;
- a second cylindrical surface between the second left flank and the second right flank and facing the opposite radial direction; and
- second raceway opposite the second cylindrical surface and located between the first left flank and the first right flank and facing the radial direction; and one or more deformation sensors for sensing, in operational use of the radial bearing, at least one of: a radial contribution to a deformation of the first ring, and a circumferential contribution to the deformation of the first ring, at a specific surface that is at least one of: the first left flank, and the first right flank.

8. The radial bearing of claim 7, wherein:
the deformation sensed includes the radial contribution;
the deformation sensor includes a first strain gauge attached to the specific surface of the specific ring and a second strain gauge attached to the specific surface of the specific ring;
an angular distance between the first strain gauge and the second strain gauge on the specific surface, and measured in a circumferential direction around the axis, is substantially equal to half of another angular distance between two adjacent ones of the rolling elements, measured in the circumferential direction; and wherein
the first strain gauge and the second strain gauge are configured for being connected in a bridge measuring circuit.

9. The radial bearing of claim 7, wherein:
the deformation sensed includes the circumferential contribution;
the deformation sensor includes a strain gauge attached to the specific surface of the specific ring; and
the strain gauge has a sensing area whose width is substantially equal to half a spacing between a pair of the rolling elements that are adjacent in the circumferential direction.

10. An axial bearing comprising:
a first ring and a second ring that are configured for substantially coaxial rotation relative to each other around an axis; and
a plurality of rolling elements accommodated between the first ring and the second ring;
the first ring having:
- a first left flank substantially facing in an axial direction parallel to the axis;
- a first right flank opposite the first left flank and substantially facing in an opposite axial direction parallel to the axis, and comprising a first raceway facing the plurality of rolling elements;
- a first cylindrical surface between the first left flank and the first right flank and facing outwards in a radial direction perpendicular to the axis; and the second ring comprising:
- a second left flank substantially facing in the axial direction parallel to the axis, and comprising a second raceway facing the plurality of rolling elements;
- a second right flank substantially facing in the opposite axial direction parallel to the axis;
- a second cylindrical surface between the second left flank and the second right flank and facing outwards in the radial direction perpendicular to the axis; and a deformation sensor operative to sense, in operational use of the axial bearing, at least one of: an axial contribution to a deformation of at least one of: a specific one of the first ring and the second ring, and a circumferential contribution to the deformation of at least the specific ring, at a specific surface that is at least one of: the first cylindrical surface and the second cylindrical surface.

* * * * *